Patented Sept. 26, 1944

2,359,134

UNITED STATES PATENT OFFICE 2,359,134

PREPARATION OF UNSYMMETRICAL FORMALS

Donald J. Loder, Wilmington, Del., assignor to E. I. du Pont de Nemours & Company, Wilmington, Del., a corporation of Delaware No Drawing. Application March 16, 1940, Serial No. 324,342

5 Claims. (Cl. 260—615)

This invention relates to the preparation of unsymmetrical acetals and their derivatives and more particularly to the preparation of alkoxy methoxy alcohols by the interaction of halogen esters of the polyhydric alcohols with acetals, and subsequently hydrolyzing the resulting halides to the alcohols.

An object of the invention is to provide a process for the preparation of the higher unsymmetrical acetals. A further object is to provide a process for the preparation of halogenated acetals by the interaction of the halogen esters of the polyhydric alcohols and more particularly the glycol halohydrins with the lower acetals and more particularly the formals. Yet another object of the invention is to provide a process for the preparation of alkoxy methoxy alcohols by the interaction of glycol chlorohydrins with the dialkyl ethers of methylene glycol and subsequently hydrolyzing the resulting halogenated acetal to the corresponding hydroxy acetal.

Broadly, the process may be conducted by reacting an acetal with a halogen ester of the polyhydric alcohols and when equilibrium has been substantially reached, recovering therefrom the unsymmetrical halogenated acetal produced, which may subsequently be hydrolyzed to the corresponding hydroxy acetal. More specifically, the halogen acetal is prepared by reacting, preferably while under reflux, an acetal with a glycol halogen hydrin, such as ethylene chlorohydrin, the reaction preferably being catalyzed by an acidic catalyst. When equilibrium has been substantially established, the catalyst, if any, is neutralized, the unreacted starting acetal removed by distillation and the unsymmetrical halogenated acetal subsequently recovered from the residue by rectification, preferably under reduced pressure. The halogenated acetal is then hydrolyzed in the presence of water and a suitable base such as the alkali metals, and alkaline earth metal hydroxides, carbonates, or alkoxides (e. g. sodium methoxide or ethoxide). If the alkoxides are employed halogen is replaced by an alkoxide group in lieu of the hydroxy group.

The reaction is preferably conducted under reflux at one atmosphere pressure, although super or sub-atmospheric pressures may be employed if desired. The temperature of the reflux will, of course, be determined by the nature of the constituents being reacted and the pressure superimposed on the reactants.

It has been indicated that the reaction proceeds preferably in the presence of an acidic type catalyst such, for example, as sulfuric acid, paratoluene sulphonic acid, camphor sulphonic acid, hydrochloric acid, calcium chloride, or other acid catalysts of this general character. Such catalysts should preferably be present in amounts ranging from 0.001 to 0.1 part thereof per part of the formal reacted.

Inasmuch as the reaction involves fundamentally the interaction of equimolecular proportions of the acetal with the halogen ester of the glycols, there should be employed to satisfy theoretical stoichiometrical requirements substantially equimolecular proportions of the acetal and the halogen ester. It has been found, however, that it is usually preferable to have the acetal present in excess, say between 2 to 10 moles thereof per mole of the halogen ester.

Generically the reaction may be illustrated as proceeding in accord with the empirical equation in which $HOC_nH_{2n}X$ designates particularly the 1,2 halohydrins:

(1) 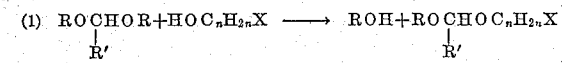

wherein R is a hydrocarbon radical; R' is hydrogen or a hydrocarbon radical; X is a halogen such as chlorine, bromine, fluorine or iodine, and $n$ is an integer greater than 1. Examples of the above reaction may be illustrated by the theoretical equations:

(2) 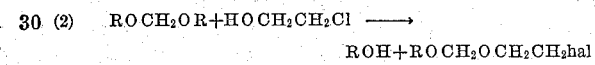

(3) 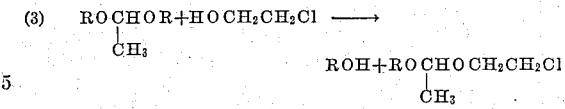

Equation (2) illustrates the interaction of, for example, methylal with ethylene chlorohydrin to give (methoxy methoxy) ethyl chloride, that is, mono(methoxy methoxy) ether of ethylene chloride, $CH_3OCH_2OCH_2CH_2Cl$; while (3) illustrates the preparation, for example, of (methoxy ethoxy) ethyl chloride,

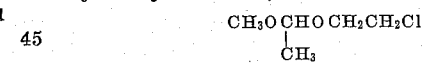

These halides may be separated from the reaction mixture and then hydrolyzed by a base to the corresponding alcohol or, by a metal alkoxide to the corresponding ether derivative.

It has been stated that the reaction is carried out until equilibrium has been substantially reached, the unsymmetrical halogenated formal being then removed. If an acidic catalyst is employed, the removal of the product is preferably effected by distillation after destroying the catalyst. While if the reaction is conducted in the absence of a catalyst, the unsymmetrical halogenated formal may, if desired, be removed as formed by extraction or by other suitable means.

The example given illustrates a preferred embodiment of the invention, but it will be understood that the invention is not restricted to the particular details thereof. Parts are by weight. A solution containing 760 parts of methylal, 160 parts of ethylene chlorohydrin and 1.8 parts of sulfuric acid was heated under reflux at atmospheric pressure for a period of three hours. At the end of the heating period 5 parts of sodium bicarbonate was added to the reaction mixture and excess methylal was removed by distillation at atmospheric pressure. The residue after distillation was diluted with ether and washed with three successive quantities of water to remove inorganic salts and unreacted ethylene chlorohydrin. The product was purified by distillation at atmospheric pressure. The conversion of ethylene chlorohydrin to (methoxy methoxy) ethyl chloride was 44%. It had a boiling point between 130.5 and 136.8° C., was insoluble in water but soluble in acetone and hydrocarbons.

A mixture containing 62 parts of (methoxy methoxy) ethyl chloride, 300 parts of water and 25 parts of sodium hydroxide was heated under reflux at atmospheric pressure for a period of four hours. Ten parts of sodium hydroxide was added to the reaction mixture and heating was continued for an additional four hour period. The solution thus obtained was concentrated by distillation at atmospheric pressure, during which 200 parts of water and 6 parts of a water insoluble liquid were collected in the distillate. By ether extraction of the cooled concentrate 25.5 parts of (methoxy methoxy) ethanol was isolated.

The acetals which may be used include dimethyl, diethyl, dipropyl formal and the higher symmetrical and unsymmetrical formals; acetaldehyde diethyl acetal, acetaldehyde methyl ethyl acetal, propanal dimethyl acetal, propanal diethyl acetal, butyral dimethyl acetal, and higher symmetrical and unsymmetrical acetals. Cyclic acetals may likewise be included, such, for example, as the ethylene, propylene, butylene, and higher alkylene acetals. In lieu of the acetals per se, the corresponding aldehyde and alcohol may be used, for example, in lieu of methylal, formaldehyde and methanol may be employed in substantially the molal ratios required to give the desired amount of formal. Ketals may also be used if desired in lieu of or in conjunction with the acetals, examples of which are 2,2 dimethoxy propane, $(CH_3)_2C(OCH_3)_2$;

2,2 dimethoxy butane, $(C_2H_5)(CH_3)C(OCH_3)_2$;

2,2 diethoxy propane, $(CH_3)_2C(OC_2H_5)_2$; cyclohexanone ketals and the like.

The glycol halohydrins generally may be used, specific examples of which include ethylene glycol, propylene glycol, butylene glycol, diethylene glycol, and higher glycol halohydrins.

From a consideration of the above specification, it will be appreciated that various changes may be made in the details therein given without departing from the scope of the application.

I claim:

1. A process for the preparation of an unsymmetrical formal which comprises reacting a formal with a glycol chlorohydrin in the presence of an acidic catalyst, separating the halogenated product and subsequently hydrolyzing it in the presence of a base to the corresponding alcohol.

2. A process for the preparation of an alkoxy methoxy monohydric alcohol which comprises reacting a dialkyl ether of methylene glycol with an alkylene halogen hydrin in the presence of an acidic catalyst, separating from the reaction product the alkoxy methoxy alkyl halide, and subsequently hydrolyzing said halide to an alkoxy methoxy aliphatic alcohol.

3. A process for the preparation of (methoxy methoxy) ethanol which comprises reacting methylal with ethylene chlorohydrin in the presence of an acidic catalyst, separating (methoxy methoxy) ethyl chloride from the reaction product and subsequently hydrolyzing the (methoxy methoxy) ethyl chloride to (methoxy methoxy) ethanol.

4. A process for the preparation of (methoxy methoxy) ethanol which comprises reacting methylal with ethylene chlorohydrin in the presence of sulfuric acid as the catalyst, after equilibrium has been substantially established, neutralizing the catalyst, separating the (methoxy methoxy) ethyl chloride and subsequently hydrolyzing said chloride to (methoxy methoxy) ethanol.

5. A process for the preparation of (methoxymethoxy) ethanol which comprises preparing a solution of the approximate composition, 760 parts of methylal, 160 parts of ethylene chlorhydrin, and 1.8 parts of sulfuric acid, heating the mixture under reflux at atmospheric pressure for approximately three hours, adding 5 parts of sodium bicarbonate to the reaction mixture, removing the excess methylal by distillation at atmospheric pressure, separating the (methoxymethoxy) ethyl chloride and after adding to 62 parts thereof, 300 parts of water and 25 parts of sodium hydroxide, heating under reflux at atmospheric pressure for a period of four hours in the presence of an additional 10 parts of sodium hydroxide and finally seaprating the (methoxymethoxy) ethanol by extraction.

DONALD J. LODER.